United States Patent
Sievers et al.

[11] Patent Number: 6,163,752
[45] Date of Patent: Dec. 19, 2000

[54] METHOD AND ARRANGEMENT FOR REPRESENTING DATA IN VEHICLE NAVIGATION SYSTEMS

[75] Inventors: Stefan Sievers, Wasbüttel; Dieter Kriegel, Adenbüttel; Thomas Dobberkau, Meine; Frank Golisch, Braunschweig, all of Germany

[73] Assignee: Volkswagen AG, Wolfsburg, Germany

[21] Appl. No.: 09/263,286

[22] Filed: Mar. 5, 1999

[30] Foreign Application Priority Data

Mar. 5, 1998 [DE] Germany ............... 198 09 263

[51] Int. Cl.[7] ............... G01C 22/00; G01C 21/00; G01S 3/02
[52] U.S. Cl. ............... 701/212; 701/23; 342/357.01; 342/451; 340/988; 340/990; 340/995
[58] Field of Search ............... 701/212, 214, 701/200, 201, 23, 25, 26; 340/988, 990, 995; 342/357.01, 357.08, 357.02, 450, 457, 451

[56] References Cited

U.S. PATENT DOCUMENTS

| | | | |
|---|---|---|---|
| 5,084,822 | 1/1992 | Hayami | 364/449 |
| 5,274,387 | 12/1993 | Kakihara et al. | 342/451 |
| 5,537,323 | 7/1996 | Schulte | 364/449 |
| 5,724,316 | 3/1998 | Brunts | 368/10 |

FOREIGN PATENT DOCUMENTS

| | | |
|---|---|---|
| 19516647 | 8/1996 | Germany . |
| 29619839 U | 11/1996 | Germany . |
| 19527786 | 4/1997 | Germany . |

*Primary Examiner*—William A. Cuchlinski, Jr.
*Assistant Examiner*—Yonel Beaulieu
*Attorney, Agent, or Firm*—Baker Botts L.L.P.

[57] ABSTRACT

A method and arrangement for representation of data in a navigation system includes an input unit, a data memory, a position-determining unit, an evaluating unit and a control unit to control a display. From a destination entered in the input unit and the current vehicle location determined by the position-determining unit, the evaluating unit determines a route to the destination from cartographic data stored in the data memory. The evaluating unit also selects reference points of decision and/or orientation along the route and the scale of the map section displayed in the display unit is adjusted as a function of the distance between the current vehicle position and the next point of decision and/or orientation.

6 Claims, 1 Drawing Sheet

METHOD AND ARRANGEMENT FOR REPRESENTING DATA IN VEHICLE NAVIGATION SYSTEMS

BACKGROUND OF THE INVENTION

This invention relates to method and arrangements for representing data in vehicle navigation systems.

Navigation systems for vehicles are arranged so that map information stored in a memory of large capacity, for example a CD-ROM, is indicated and/or reproduced on a picture screen. The map information may be displayed, for example in the form of routes, i.e. by direction and/or course of travel, by means, distances and directions of roads, places along the roads or in the form of places and names of intersections and localities, and names of buildings.

The purpose of such navigation systems is to indicate to the vehicle operator on the screen, the place where the vehicle is located, the vehicle position being indicated in each instance with a map image as a background. The indication of the vehicle position with a map image in the background may be achieved in several ways. In one display method the vehicle indicator is fixed in one position, generally a central position, relative to the screen and the background image of the map is shifted appropriately as the vehicle travels.

This method is classified in turn into two submethods:

(a) The upper direction of the screen is fixed, always oriented, for example, to the north. The background map image shifts parallel to the direction of a mark or icon representing the vehicle. Although the mark remains in one position on the screen, it changes its orientation on the screen in accordance with the actual direction of motion or travel of the vehicle with respect to the map, and the background map image shifts its direction of motion in accordance with the change of orientation of the mark.

(b) The mark does not change its orientation in accordance with a change of direction of motion of the vehicle. However, the background image of the map moves parallel to the orientation of the mark and thus rotates in accordance with the actual motion of the vehicle with respect to the ground.

According to a second basic method, a single image section of the map is reproduced in stationary form and the top to the map on the screen is fixedly directed to the north. The mark representing the vehicle moves over the stationary image of the map until the vehicle reaches a location corresponding to a marginal section of the map image on the screen. At that time, and successively thereafter, additional, non-shifting sections of the map are displayed to show the region in which the vehicle is traveling.

In another navigation system, after entry of a destination, the route from the present location to the destination as recommended by the system is automatically selected on the screen and indicated on the map. This navigation system, indicating a combination of both the route and the present vehicle position, in principle displays on the screen only the route along which the vehicle is traveling. At best, it will show corners at which the vehicle can turn. Therefore, such a navigation system has the following disadvantages. In the display on the screen, the length of the remaining route shortens as the vehicle position travels along the route. Also, the end of the screen may possibly be reached before the vehicle arrives as the destination. At that time, the continuation of the route is not shown, and the operator is not able to ascertain the present vehicle position. If, according to the method described above, the position of the vehicle indicator is maintained at the center of the screen, the length of the route reproduced in the display amounts to about half the total size of the screen. This is disadvantageous in terms in terms of effective use of a small or narrow screen.

U.S. Pat. No. 5,274,387 discloses a navigation system for vehicles with a display predetermined size to reproduce a map image having provision for setting the scale of the map image and for showing the present vehicle position in which, in a first mode, the map image is reproduced to a scale and shifted so that the current vehicle position is always shown at about the center of the display, whereas, in a second mode, the route of travel is indicated at essentially its maximum length on the map image. In the second mode, before the commencement of display, a map image is set on the display permitting selection of a maximal segment of the route of travel for display and thereafter the indicated segment of the travel route is traversed at constant map scale so that, after traversal of the displayed segment of the travel route, another map image is displayed having the same scale and again displaying a maximal segment of the travel route.

U.S. Pat. No. 5,537,323 discloses a navigation system having a memory for storing cartographic data, a vehicle position detector unit, a control unit, an input unit, an image memory and a display unit, the control unit being arranged to direct a user along a previously determined route on the basis of data contained in the vehicle position detector unit and the cartographic data. The control unit is also arranged to successively reproduce the relevant map sections on the display unit from cartographic data stored in the image memory and selected in terms of a current vehicle position determined by the position detector unit. The control unit includes an image processor for reproducing the previously determined route in a complete manner in the map section of the display unit, while the image processor represents the route segment traversed to reach the current vehicle position in a different manner, reproducing only the local surroundings of the current vehicle position, including local intersections and route indications on the map.

German Offenlegungsschrift No. 195 16 647 discloses a navigation system for motor vehicles having a data memory and a display supported with information from the memory for a map section containing the current vehicle location, in which the scale of the map section is automatically enlarged at a low vehicle section. The automatic enlargement of the scale saves trouble for the operator. Moreover, coupling of the map scale with the vehicle speed assures that the operator actually receives the map section and scale he requires in terms of his style of driving. At high speed, as for example on a motorway, the map is reproduced at a small scale and contains information about a comparatively large area.

Typically, a small scale of 1:100,000 may be used in this case. At low speeds, however, such as occur in city traffic, the map scale is enlarged to a scale of 1:10,000 for example. Also, an intermediate scale of 1:50,000, for example, may be provided when the vehicle is at an intermediate speed. The assignment of a scale to the current vehicle speed may reasonably be made according to an average value of the vehicle speed. For example, the average vehicle speed may be taken over a period of 10 minutes. In addition, according to this reference the change of scale may also be made dependent on the distance of the vehicle from its destination.

A destination in turn may, for example, be entered before the beginning of the trip or else entered for a selected trip distance. For example, if the vehicle is at a distance of 1 kilometer from its destination, a switch to the larger scale may be made automatically. This facilitates convenient finding of the destination. A disadvantage of such navigation systems is that the required density of information does not automatically depend on the vehicle speed, so that the vehicle operator may receive too much or too little information at the scale shown.

SUMMARY OF THE INVENTION

Accordingly, it is an object of the present invention to provide a method and arrangement for representing data in vehicle navigation systems which overcomes disadvantages of the prior art.

Another object of the invention is to provide a method and arrangement for representing data in vehicle navigation systems in which the representation of the data is optimally adapted to the needs of the vehicle operator.

These and other objects of the invention are attached by providing a navigation system in which the scale of a displayed map is adjusted in accordance with the distance of the vehicle from a predetermined location on the route to be followed by the vehicle. By adaptive adjustment of the scale as a function of the distance between the current vehicle location and the nearest point of decision and/or orientation, the vehicle operator is provided with a high-density of information in accordance with the map scale whenever orientation is really required. This may be the case even at high vehicle speeds, for example when approaching a selected highway exit in which case a small map scale would be indicated based on the vehicle speed. By contrast, according to the invention the driver always gets an enlarged scale, independently of his vehicle speed, when approaching the preselected locations on the route which are points of decision and/or orientation, so that the operator receives the maximum amount of data from the display just when he has to make a decision, for example because a curve or other steering maneuver is required. After the operator has passed the point of decision, the scale is reduced again, so that the driver again receives an improved overview without unnecessary details.

In a particular embodiment of the invention, the scale is chosen so that the current location and the nearest point of decision for the driver will just be pictured at the edges of the display and the route between those points fills the display screen as completely as possible.

Further, provision is made so that the operator can select additional points of orientation and/or remove selected points of orientation, thus making an individually adapted display possible. Thus, for example, the operator may be quite familiar with one segment of the route so that he may find large-scale representation superfluous or even annoying. On the other hand, there may be segments of the route that the operator finds especially troublesome so that additional information would be helpful.

In addition, the rate of adaptation, for example the frequency with which a new representation is displayed, may be made dependent on the vehicle speed.

Also, the extent of adjustment of scale when approaching a decision point may be different from the extent of adjustment after passing the point of decision.

BRIEF DESCRIPTION OF THE DRAWING

Further objects and advantages of the invention will be apparent from a reading of the following description in conjunction with the accompanying single drawing which is a schematic block illustrating a representative embodiment of an arrangement navigation system.

DESCRIPTION OF PREFERRED EMBODIMENTS

Figure 1:
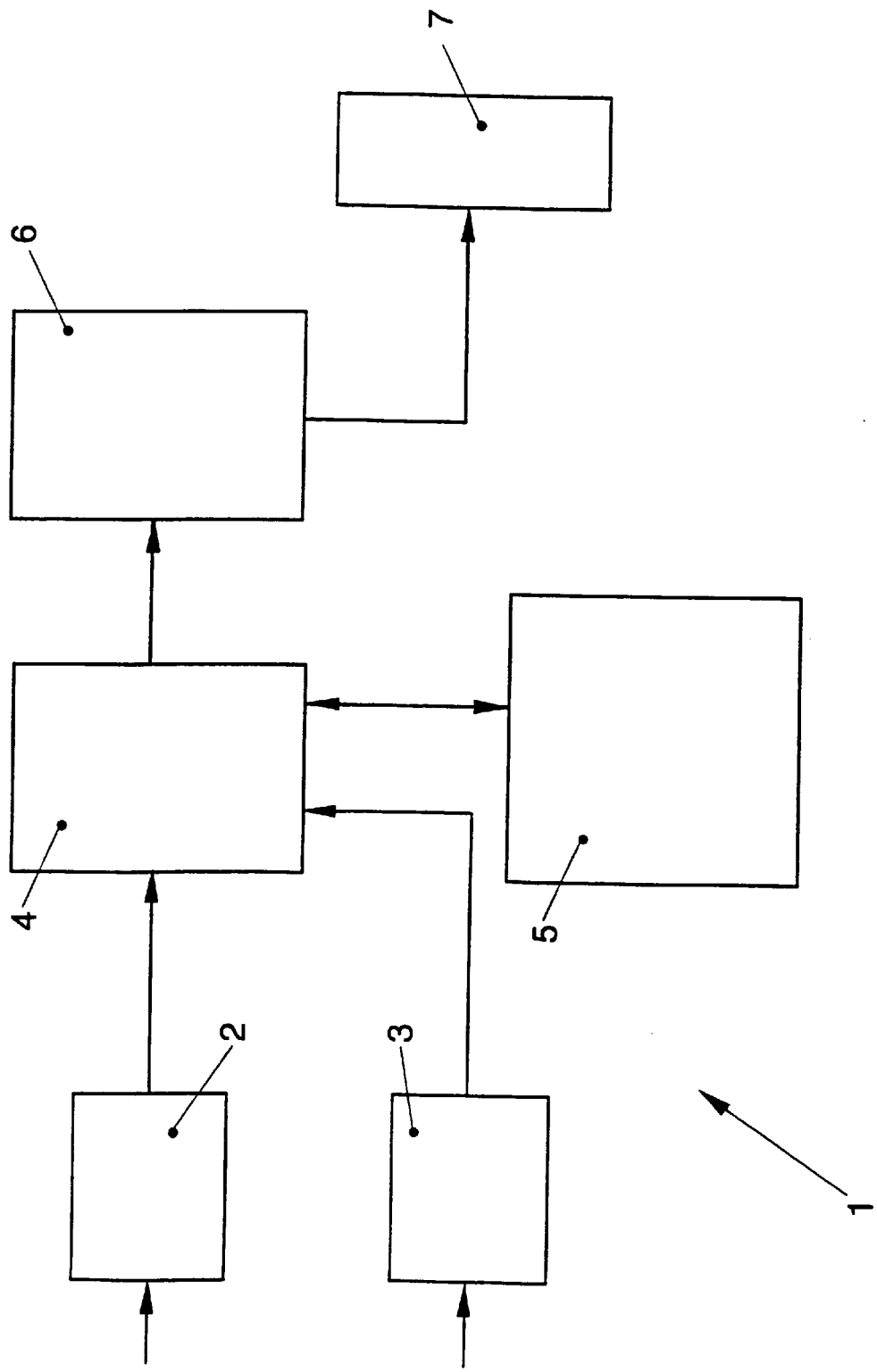

In the typical embodiment illustrated in the drawing, a data representation arrangement 1 includes a data input 2, a vehicle position-determining unit 3, an evaluating unit 4, a data memory 5, a control unit 6 and a display 7.

The data input unit 2, which may, for example, be an alphanumeric key pad, has its output connected to a data input of an evaluating unit 4. Similarly, a vehicle position-determining unit 3 has an output connected to another data input of the evaluating unit 4. A desired destination can be entered by the vehicle operator into the input unit 2. The evaluating unit 4 then determines, by using conventional algorithms, an optimal route between the current vehicle location and the desired destination based on cartographic data stored in the data memory 5 which are drawn upon to provide, for example, a display in the form of a digital vector chart. If desired, current traffic reports are taken into account in setting up the route.

After the route has been determined, it is provided to the operator on the display unit 7. In addition, the evaluating unit 4 selects points of decision and orientation and highlights them visually on the route displayed. Such points of decision may be places where the operator must perform active maneuvers, for example turns at intersections, motorway exits and the like. Points of orientation are places of high density of traffic information, where the driver need not necessarily take any action, but might be misled into taking action for lack of specific information. The driver may then confirm the route with the selected points of decision and orientation as shown in the display 7 or else put in additional points of orientation and/or remove selected points.

When this input operation has been concluded, the evaluating unit 4 contains the complete route with a selected number of points of decision and orientation. The evaluating unit 4 then reads out the cartographic data for the first route segment between the current vehicle location and the first point of decision or orientation from the data memory 5 and converts them to a scale selected so that the route between the current location and the next point of decision or orientation fills the image in the display 7 as completely as possible. The next point of decision does not necessarily mean the nearest point on a bee line, but the point to be passed next in time.

It is also possible that the current vehicle location may always be represented in the center of the display 7. While this reduces the density of data to be represented, since a scale about half as large, e.g., 1:100,000 rather than 1:50,000, must be selected, yet the central vehicle representation may improve the operator's visual perception.

Since the motor vehicle is in motion, a specific representation in the display 7 is always correct for only a certain period of time. The frequency with which the representation in the display 7 must be updated may be either fixed or else variable as a function of external parameters such as vehicle speed and/or traffic density.

As the motor vehicle approaches a point of orientation or decision, the data are represented in the display to a larger and larger scale so that the operator receives an optimal overview just before that point is reached. After the decision or orientation point has been passed, there are two alternative procedures. Either the point passed continues to be represented for a brief period, in which case the scale will be progressively reduced, or the system is switched at once to display the next point of orientation or decision so that the route between the current vehicle location and that point is made to fill the screen.

Although the invention has been described herein with reference to specific embodiments, many modifications and variations therein will readily occur to those skilled in the art. Accordingly, all such variations and modifications are included within the intended scope of the invention.

We claim:

1. An arrangement for representing data in a vehicle navigation system comprising:

an input unit;

a data memory;

a vehicle position-determining unit;

an evaluating unit; and a control unit for controlling a display by which, based on data stored in the data memory and the current vehicle position determined by the position-determining unit, the evaluating unit determines a route to a destination entered in the input unit with selected points of decision and/or orientation within the route and wherein the scale of a map display to be represented is adjusted as a function of the distance from the current vehicle position to a point of decision and/or orientation.

2. A method of representing data in a vehicle navigation system having an input unit, a data memory, a position-determining unit, an evaluating unit and a control unit for controlling a map display, comprising the following steps:

a. entering a desired destination in the input unit;

b. determining the current vehicle position in the position-determining unit;

c. calculating a route in the evaluating unit from the vehicle position to the desired destination from cartographic data stored in the data memory;

d. selecting and storing reference points within the route calculated by step c);

e. reading out from the data memory by use of the evaluating unit cartographic data for a region around the current vehicle position;

f. determining the distance form the current vehicle position to the next reference point selected according to step d);

g. calculating a scale for the data to be represented in a map display as a function of the distance determined in step f); and h. transmitting the data for the scale calculated in step g) to the control unit.

3. A method according to claim 2 wherein the scale is always selected so that the route between the current vehicle location and the next reference point is represented in the map display so as to substantially fill the display image.

4. A method according to claim 2 wherein, after entry of a desired destination, the selected reference points within the route are displayed and additional reference points are entered and/or selected points are removed by the input unit.

5. A method according to claim 2 including changing the scale of the map display presentation as a function of the vehicle speed.

6. A method according to claim 2 wherein the scale of the map display presentation upon approach to a reference point is different from the scale of the map display presentation upon departure from a reference point.

* * * * *